United States Patent
Rojas-Cessa et al.

(10) Patent No.: US 9,118,557 B2
(45) Date of Patent: Aug. 25, 2015

(54) MEASUREMENT OF PACKET PROCESSING TIME OF END HOSTS THROUGH ESTIMATION OF END LINK CAPACITY

(71) Applicant: New Jersey Institute of Technology, Newark, NJ (US)

(72) Inventors: Roberto Rojas-Cessa, Brooklyn, NY (US); Khondaker M. Salehin, Passaic, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 156 days.

(21) Appl. No.: 13/882,687

(22) PCT Filed: Oct. 30, 2012

(86) PCT No.: PCT/US2012/062586
§ 371 (c)(1),
(2) Date: Apr. 30, 2013

(87) PCT Pub. No.: WO2014/070143
PCT Pub. Date: May 8, 2014

(65) Prior Publication Data
US 2014/0119215 A1 May 1, 2014

(51) Int. Cl.
*H04L 12/801* (2013.01)
*H04L 12/26* (2006.01)
*H04W 80/04* (2009.01)
*H04W 88/06* (2009.01)

(52) U.S. Cl.
CPC ............ *H04L 43/0852* (2013.01); *H04L 43/10* (2013.01); *H04L 43/106* (2013.01)

(58) Field of Classification Search
CPC ....... H04L 47/10; H04L 43/50; H04W 80/04; H04W 88/06
USPC .................................................. 370/252, 328
See application file for complete search history.

(56) References Cited

U.S. PATENT DOCUMENTS

| | | |
|---|---|---|
| 2003/0152034 A1 | 8/2003 | Zhang et al. |
| 2008/0008178 A1* | 1/2008 | Tychon et al. ................ 370/392 |
| 2011/0149751 A1 | 6/2011 | Li et al. |
| 2014/0043975 A1* | 2/2014 | Zhu et al. ...................... 370/235 |

OTHER PUBLICATIONS

"Iperf," accessed at http://web.archive.org/web/20120908051833/http://iperf.sourceforge.net/, accessed on Jul. 25, 2014, p. 1.
Dong, J., et al., "Secure High-Throughput Multicast Routing in Wireless Mesh Networks," IEEE Transactions on Mobile Computing, vol. 10, No. 5, pp. 653-668 (2011).

(Continued)

*Primary Examiner* — Ronald B Abelson
(74) *Attorney, Agent, or Firm* — Turk IP Law, LLC

(57) ABSTRACT

Technologies are generally described for measuring packet processing time of a remotely connected host device. According to some examples, link capacity may be measured to estimate the packet processing time (PPT). The capacity of the link connected to a host may be measured through active probing with the hosts time-stamping each probing packet after receiving it. Thus, PPT information may be included in the packet receiving process and the processes that the packet undergoes defined by the nature of different computing applications, time-stamping a packet is an example of a process that involves processing time.

20 Claims, 6 Drawing Sheets

(56) References Cited

OTHER PUBLICATIONS

Gast, M., "When Is 54 Not Equal to 54? A Look at 802.11a, b, and g Throughput," accessed at http://web.archive.org/web/20121024040039/http://www.oreillynet.com/pub/a/wireless/2003/08/08/wireless_throughput.html, Accessd on Jul. 25, 2014, pp. 1-4.

International Search Report and Written Opinion for International Application No. PCT/US2013/055844, mailed on Nov. 1, 2013.

Johnsson, A. and Björkman, M., "On Measuring Available Bandwidth in Wireless Networks," In Proceedings of IEEE 33rd Conference on Local Computer Networks, pp. 861-868 (2008).

Johnsson, A., et al., "An Analysis of Active End-to-end Bandwidth Measurements in Wireless Networks," In Proceeding 4th IEEE/IFIP Workshop on End to End Monitoring Technique and Services, pp. 74-81 (2006).

Lakshminarayanan K., et al., "Bandwidth Estimation in Broadband Access Networks," in Proceedings IMC'04, pp. 314-321 (2004).

Li, M., et al., "WBest: A Bandwidth Estimation Tool for IEEE 802.11 Wireless Networks," in Proc. 33rd Annual IEEE Conference on Local Computer Networks, pp. 374-381 (2008).

Salehin, K.M., and Rojas-Cessa, R., "Active Scheme to Measure Throughput of Wireless Access Link in Hybrid Wired-Wireless Network," in Proceedings of IEEE Wireless Communications Letters, vol. 1, Issue 6, pp. 645-648 (2012).

Shah, H. S., et al., "Available Bandwidth Estimation in IEEE 802.11 based Wireless Networks," in Proc. First ISMA Workshop on Bandwidth Estimation, pp. 1-3 (2003).

Vassis, D., et al., "The IEEE 802.11g Standard for High Data Rate WLANs," IEEE Network, vol. 19, No. 3, pp. 21-26 (2005).

IEEE Standard 802.11 "Wireless LAN Medium Access Control (MAC) and Physical Layer (PHY) Specifications," IEEE Computer Society, pp. 1233 (2007).

Salehin, K.M., and Rojas-Cessa, R., "Schemes to Measure Available Bandwidth and Link Capacity with Ternary Search and Compound Probe for Packet Networks," 17th IEEE Workshop on Local Metropolitan Area Networks (LANMAN), pp. 1-5 ( 2010).

International Search Report and Written Opinion of the International Searching Authority, mailed on Jan. 14, 2013.

Wilimann et al., "An effcien Pogammable 10 Giganit Ethernet Network Interface Card". In Proc of IEEE HPCA-11. CA, USA, pp. 96-107. Feb. 2005.

Almes et al., "A One-way Delay Metric for IPPM", RFC 2679, http://www.ietf.org/rfc/rfc2679.txt, Sep. 1999.

Almes et al., "A Round-trip Delay Metric tor IPPM", RFC 2681, http://www.ietf.org/rfc/rfc2681.txt, Sep. 1999.

Bolot, "End-to-End Packet Delay and Loss Behavior in the Internet", in Proc, ACM SIGCOMM, NY, USA, Oct. 1993, pp. 289-298.

Carter et al., "Measuring Bottleneck Link Speed in Packet-Switched Networks", Performance evaluation, vol. 27 and 28, pp. 297-318, Mar. 15, 1996.

Paxson, "PhD Thesis", Ph.D, dissertation, University of California, Berkeley: Stanford, California, Apr. 1997.

Dovrolis et al "Packet Dispersion Techniques and a Capacity Estimation Methodology". IEEE ToN, vol. 12, No. 6, pp. 963-977, Dec. 2004.

Jacobson; "A Tool to infer Characteristics of Internet Paths", ftp://ftp.ee.lbl.gov/pathchar/msri-talk.pdf, Berkeley, CA, Apr. 21, 1997.

Downey et al., "Using Pathchar to Estimate Internet Link Characteristics", in Proc. of ACM SIGCOMM, MA, USA, pp. 241-250, Oct. 1999.

Mah, "Pchar: A Tool for Measuring Internet Path Characteristics", http://www.kitchenlab.org/www/bmah/Software/pchar/, Last modified on Feb. 12, 2005.

Lai et al., "Measuring Link Bandwidths Using a Deterministic Model of Packet Delay", in Proc of ACM SIGCOMM, Stockholm, Sweden, pp. 283-294, Oct. 2000.

Harfoush et al., "Measuring Bottleneck Bandwidth of Targeted Patch Segments", in Proc. of IEEE INFOCOM, CA, USA, pp. 2079-2089, Feb. 2009.

Salehin et al., "A Combined Methodology for Measurement of Available Bandwidth and Link Capacity in Wired Packet Networks", IET Communications, vol. 4, No. 2, pp. 240-252, Jan. 22, 2010.

Hu et al., "Evaluation and Characterization of Available Bandwidth Probing Techniques", IEEE JSAC, vol. 21, No. 6, pp. 879-894, Aug. 2003.

Wireshark; http://www.wireshark.org/, Sharkfest '13, Wireshark Developer and User Conference, UC Berkeley: Jun. 6-19, 2013.

Prasad et al., "Effects of Interrupt Coalescence on Network Measurements", in Proc. of IEEE PAM, France, pp. 247-256, Apr. 19, 2004.

Caida, The Cooperative Association for Internet Data Analysis, "Packet size distribution comparison between Internet links in 1998 and 2008"; http://www.caida.org/research/trafficanalysis/pkt_size_distribution/graphs.xml.

Leinen, "What Flows in a Research and Education Network?", Switch Serving Swiss Universities, Apr. 2009.

Sargento, "Capacity and Cross-Traffic Estimation / All Links in a Path Using ICMP Timestamps", ICN/CONS/MCL, Apr. 23-29, 2006.

Salehin et al., "Scheme to Measure Packet Processing Time of a Remote Host through Estimation of End-Link Capacity", Nov. 18, 2012.

Endace DAG 7.5G2 datasheet; http://www.endace.com/assets/files/resources/END Datasheet DAG7.5G2 3.0pdf; Jan. 20, 2012.

Anagnostakis et al., "cing: Measuring Network-Internal Delays using only Existing Infrastructure", IEEE INFOCOM 2003, vol. 3, pp. 2112-2121, Mar. 30-Apr. 3, 2003.

\* cited by examiner

US 9,118,557 B2

MEASUREMENT OF PACKET PROCESSING TIME OF END HOSTS THROUGH ESTIMATION OF END LINK CAPACITY

CROSS-REFERENCE TO RELATED APPLICATION

This Application is the U.S. National Stage filing under 35 U.S.C. 371 of PCT Application No. PCT/US2012/062586 filed on Oct. 30, 2012.

BACKGROUND

Unless otherwise indicated herein, the materials described in this section are not prior art to the claims in this application and are not admitted to be prior art by inclusion in this section.

Network latency in a packet-switched network may be measured one-way (the time from the source sending a packet to the destination receiving the packet) or round-trip (the one-way latency from source to destination plus the one-way latency from the destination back to the source). While round-trip latency is more often used, because it can be measured from a single point, it may obscure/hide the amount of time that a destination system spends processing the packet. Some software platforms employ pinging that can be used to measure round-trip latency. Pinging performs long packet processing; it merely sends a response back when it receives a packet.

However, a typical packet may be forwarded over many links via many gateways, each of which may not begin to forward the packet until it has been completely received. In such networks, the minimal latency may be defined as the sum of the minimum latency of each link added to the transmission delay of each link. This latency may be further increased by queuing and processing delays. Queuing delays may occur when a gateway receives multiple packets from different sources heading towards the same destination. Since typically only one packet can be transmitted at a time, some of the packets may be queued for transmission, incurring additional delay. Processing delays are incurred while a gateway determines what to do with a newly received packet. The combination of propagation, serialization, queuing, and processing delays may often produce a complex and variable network latency profile.

The measurement of packet processing time—a component of total network latency—in a host may involve a complex setup. The complexity may increase if the host is remotely placed from the administrator (e.g., as in a cloud).

SUMMARY

The present disclosure generally describes techniques for measuring packet processing time of end hosts through estimation of end link capacity, where the end link of a host may be the link directly connected to the host under measurement.

According to some examples, a method for measuring packet processing time of end hosts through estimation of end link capacity is described. An example method may include transmitting a compound probe comprising two or more packets from a source host to a destination host, enabling the compound probe to be time-stamped at each host upon being received, and/or estimating the packet processing time based on time-stamp values of the compound probe.

According to other examples, a computing device for measuring packet processing time of end hosts through estimation of end link capacity is described. An example computing device may include a communication module configured to communicate with a plurality of other computing devices over one or more networks, a memory configured to store instructions, and a processor configured to execute a packet processing timing module. The packet processing timing module may transmit a compound probe comprising a train of probe packets from a source host to a destination host, enabling the probe packets to be time-stamped at each host upon being received, and estimate the PPT based on time-stamp values of the probe packets.

According to yet other examples, a computer-readable storage medium with instructions stored thereon for measuring packet processing time of end hosts through estimation of end link capacity is described. The instructions may cause a method to be performed when executed. The method may include transmitting a compound probe comprising two or more packets from a source host to a destination host, enabling the compound probe to be time-stamped at each host upon being received, and/or estimating the packet processing time based on time-stamp values of the compound probe.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
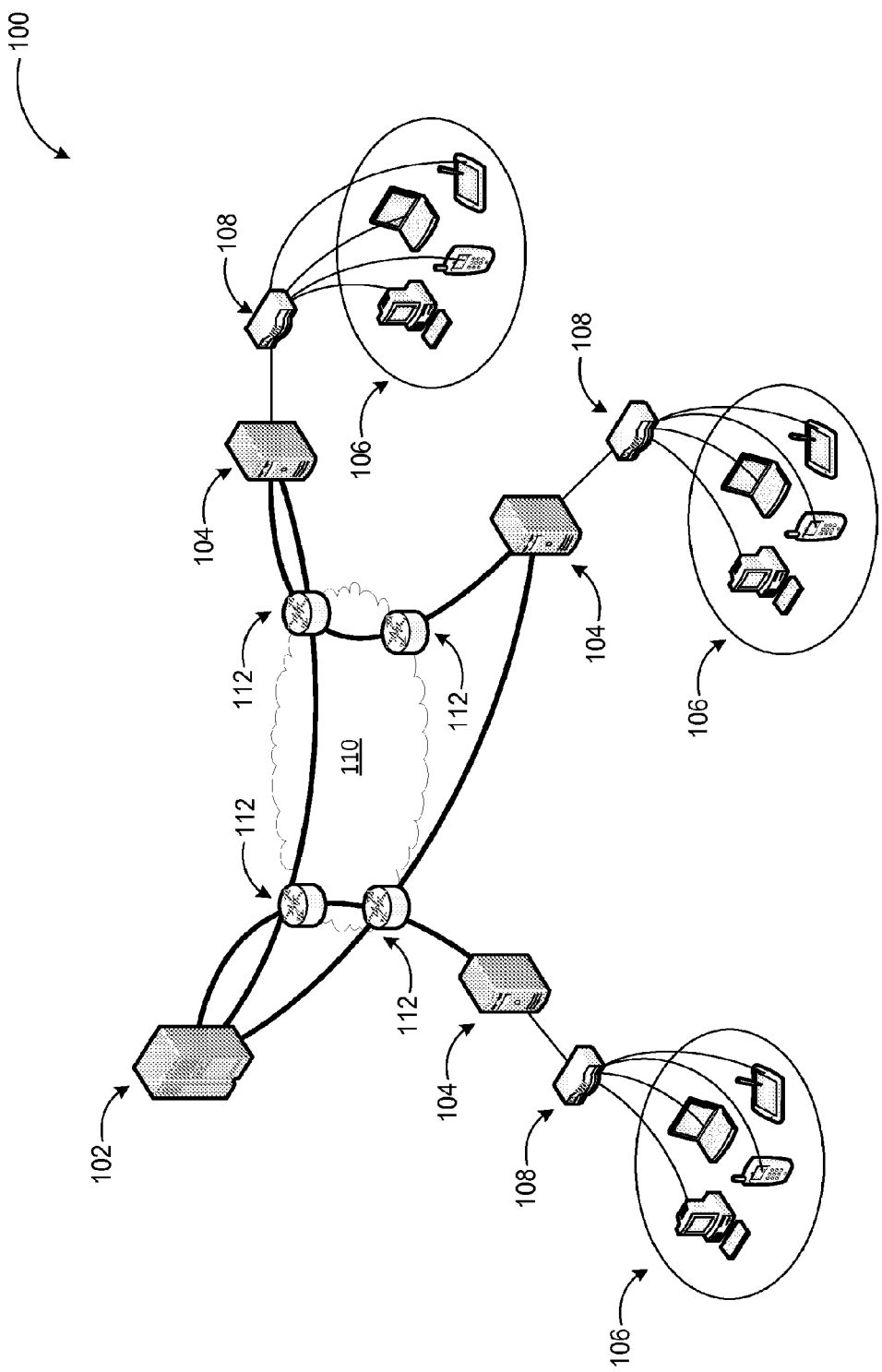
FIG. 1 is a diagram of an illustrative example network communication system, where packet processing time of end hosts may be measured through estimation of end link capacity.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to measuring packet processing time of end hosts through estimation of end link capacity.

Briefly stated, technologies are generally described for measuring packet processing time of a remotely connected host device. According to some examples, link capacity may be measured to estimate the packet processing time (PPT). The capacity of the link connected to a host may be measured through active probing with the host's time-stamping each probing packet after receiving it. Thus, PPT information may be included in the packet receiving process and the processes that the packet undergoes defined by the nature of different computing applications, time-stamping a packet is an example of a process that involves processing time.

FIG. 1 is a diagram of an illustrative example network communication system, where packet processing time of end hosts may be measured through estimation of end link capacity, arranged in accordance with at least some embodiments described herein.

Diagram 100 shows a number of different host devices in a networked environment. Network 110 may represent one or more networks including, but not limited to, wired, wireless, public, enterprise, secure, non-secure, networks. A number of host devices such as desktop computers, laptop computers, portable computers, smart phones, and the like, may communicate with other computing devices over the network 110.

In an example configuration, groups of host devices 106 may access the network through one or more specialized devices (e.g., routers 108) and/or servers 104. Switches 112 may direct data packets to their destinations over other switches, servers, and other nodes. In some examples, a centralized control server may manage network operations, redundancies, reliability, etc. In other examples, network management may be distributed over a number of servers.

Some bandwidth and delay measurement schemes involve prior knowledge of link capacities of an end-to-end path, which may not a practical assumption. Other schemes may send probing packets but in a loose manner such that the results tend to be noisy and inaccurate. Dispersion gaps of such probes may include very little information about the end-to-end path.

Packet processing Time (PPT) of an end host (e.g., a workstation) is the time elapsed between the arrival of a packet in the host's input queue (i.e., data-link layer of the TCP/IP suite) and the time the packet is processed by the application layer. During this time, the packet may be transferred from the end host's input queue of the network interface card (NIC) to the main memory before it gets time stamped at the application layer. As link rates increase to values faster than processing speeds, PPT is playing an increasingly visible role in the measurement of different network parameters.

A system according to some embodiments may measure PPT in end hosts (106) over multiple-hop network paths. The capacity measurement of a link connected to the end-hosts (end link) may be based on intra-probe gap measurement using a compound probe. The compound probe may be a set of two packets sent back-to-back, where the sizes of the packets may be predefined. Probing may be repeated under different path configurations and/or high network congestion conditions to enhance measurement robustness.

Figure 2:
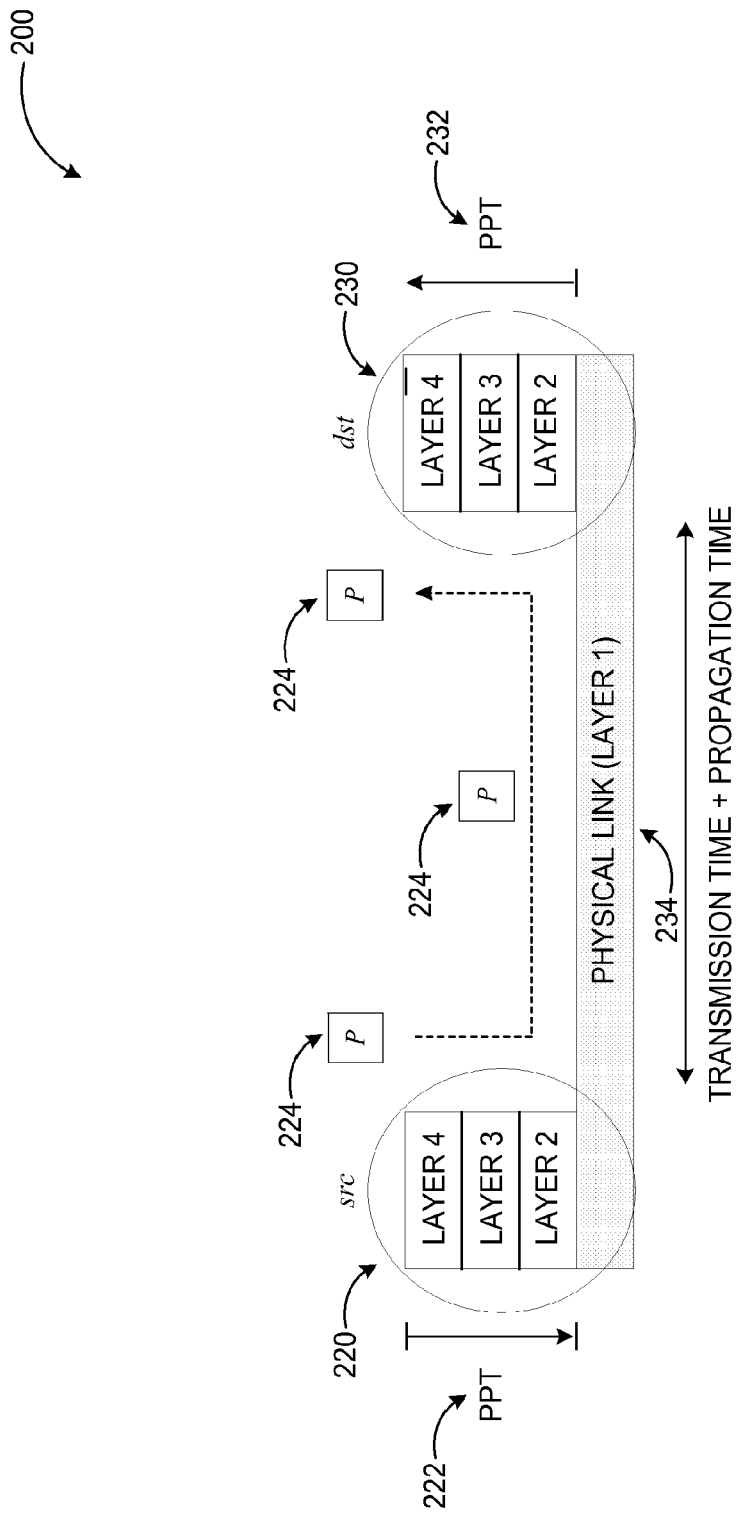
FIG. 2 illustrates an example end-to-end one way delay (OWD) of a packet P over a single-hop path.

FIG. 2 illustrates an example end-to-end one way delay (OWD) of a packet P over a single-hop path, arranged in accordance with at least some embodiments described herein.

Measurement of one way delay (OWD) is an example of a parameter that PPT may impact substantially. Diagram 200 illustrates the OWD of packet P 224 over an end-to-end path, between a source (src) host 220 and a destination (dst) host 230. As shown in diagram, the packet P 224 may traverse different layers of IP protocol stack at both end hosts (220, 230) in the OWD measurement process. Transmission time (tr), propagation time (tp), and queuing time (tq) (at intermediate nodes) of packet P 224 may take place over the physical link 234.

Packet P 224 may be time-stamped upon creation at source host 220 (PPTsrc 222) and upon receiving at destination host 230 (PPTdst 232) at the application layers of the hosts. If PPT is considered negligible, OWD may be estimated as:

$$OWD'=tp+tr+tq. \quad [1]$$

However, the actual OWD experienced by packet P 224 from source host 220 to destination host 230 may be expressed as:

$$OWD=PPTsrc+tp+tr+tq+PPTdst \quad [2]$$

The measured OWD, which may also be referred to as host time over the src-dst path, may be mainly determined by tr and tp. As data rates increase, the contribution of tr may decrease, and the error in the measurement of OWD for different packet sizes over a 100-Mb/s link may be large if PPTs are neglected.

Table 1 shows some example errors for different packet sizes, where Error=(OWD−OWD')*100/OWD', tp=tq≈0, and hosts have small PPTs (e.g., 1 µs/host). As depicted in the table, the error may be up to 125% for a minimum-size IP packet (i.e., 20 bytes). Thus, PPT may need to be considered in the measurement of OWD for fast links to avoid lame errors.

TABLE 1

Errors in OWD measurement due to PPT of end hosts

| Packet Size (bytes) | tr (µs) | Total PPT (µs) | Error (%) |
|---|---|---|---|
| 1500 | 120 | 2 | 1.67 |
| 1000 | 80 | 2 | 2.5 |
| 500 | 40 | 2 | 5 |
| 100 | 8 | 2 | 25 |
| 40 | 3.2 | 2 | 62.5 |
| 20 | 1.6 | 2 | 125 |

In an example system PPT of end hosts may be measured using end link capacity measurement, which may be feasible on different path configurations. Large amount of probing load may not be needed to measure PPT accurately even with different path configurations and under high network congestion conditions in the network. The measurement may be independent of the distance and of the level of network congestion or network traffic of a path.

Figure 3:
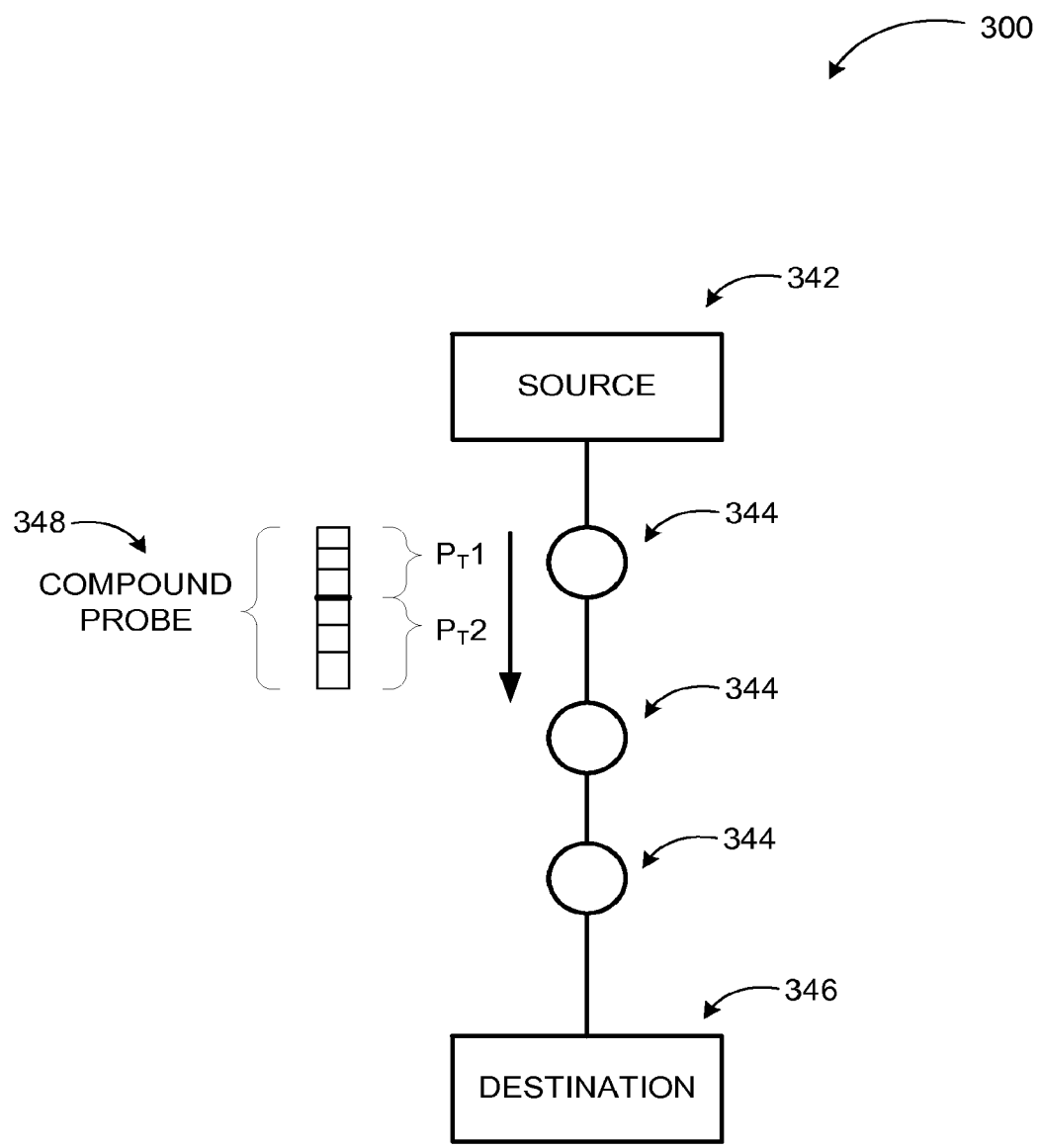
FIG. 3 illustrates conceptually use of a compound probe for measuring packet processing time of end hosts through estimation of end link capacity.

FIG. 3 illustrates conceptually use of a compound probe for measuring packet processing time of end hosts through estimation of end link capacity, arranged in accordance with at least some embodiments described herein.

A system according to some embodiments, as shown in diagram 300, may measure PPT in end hosts over multiple-hop network paths. The capacity measurement of a link connected to the end-hosts (end link) may be based on intra-probe gap measurement using a compound probe 348. The compound probe may be a set of two packets ($P_T1$, $P_T2$) sent back-to-back from source 342 to destination 346, where the sizes of the packets may be predefined. Nodes 344 represent intermediate hosts, which may be configured as multiple paths. Probing may be repeated under different path configurations and/or high network congestion conditions to enhance measurement robustness. The packet sizes may be engineered to define properties of the dispersion gaps.

In a system employing link-capacity measurement based PPT estimation, if the capacity of the link connected to a host can be measured accurately through active probing, PPT of the host may be calculated from the measured capacity value without using any specialized hardware. Active measurement method includes hosts to time-stamp each probing packet after receiving it. Therefore, PPT information is included in the packet receiving process while time-stamping a packet.

As discussed above, two trains of probing packets may be sent as the compound probe 348 using different packet sizes over an end-to-end path from source 342 to destination 346. Compound probes may arrive at the destination 346 with a zero-dispersion gap (i.e., no separation) and the intra-probe gap values may be used to determine the capacity of the end link. Because the measured intra-probe gap values include PPT at the destination node—a constant parameter—, PPT may be measured from the linear relationship between the intra-probe gap and packet size of the compound probes offset by a constant value.

Embodiments may be implemented via combinations of hardware and software components. The software components may include existing or new communication or signaling systems. Moreover, embodiments are not limited to example network systems, but may be implemented in any network system that employs packet-based communications between end hosts.

While embodiments have been discussed above using specific examples, components, scenarios, and configurations in FIG. 1 through FIG. 3, they are intended to provide a general guideline to be used for implementing measurement of packet processing time of end hosts through estimation of end link capacity. These examples do not constitute a limitation on the embodiments, which may be implements using other components, optimization schemes, and configurations using the principles described herein.

Figure 4:
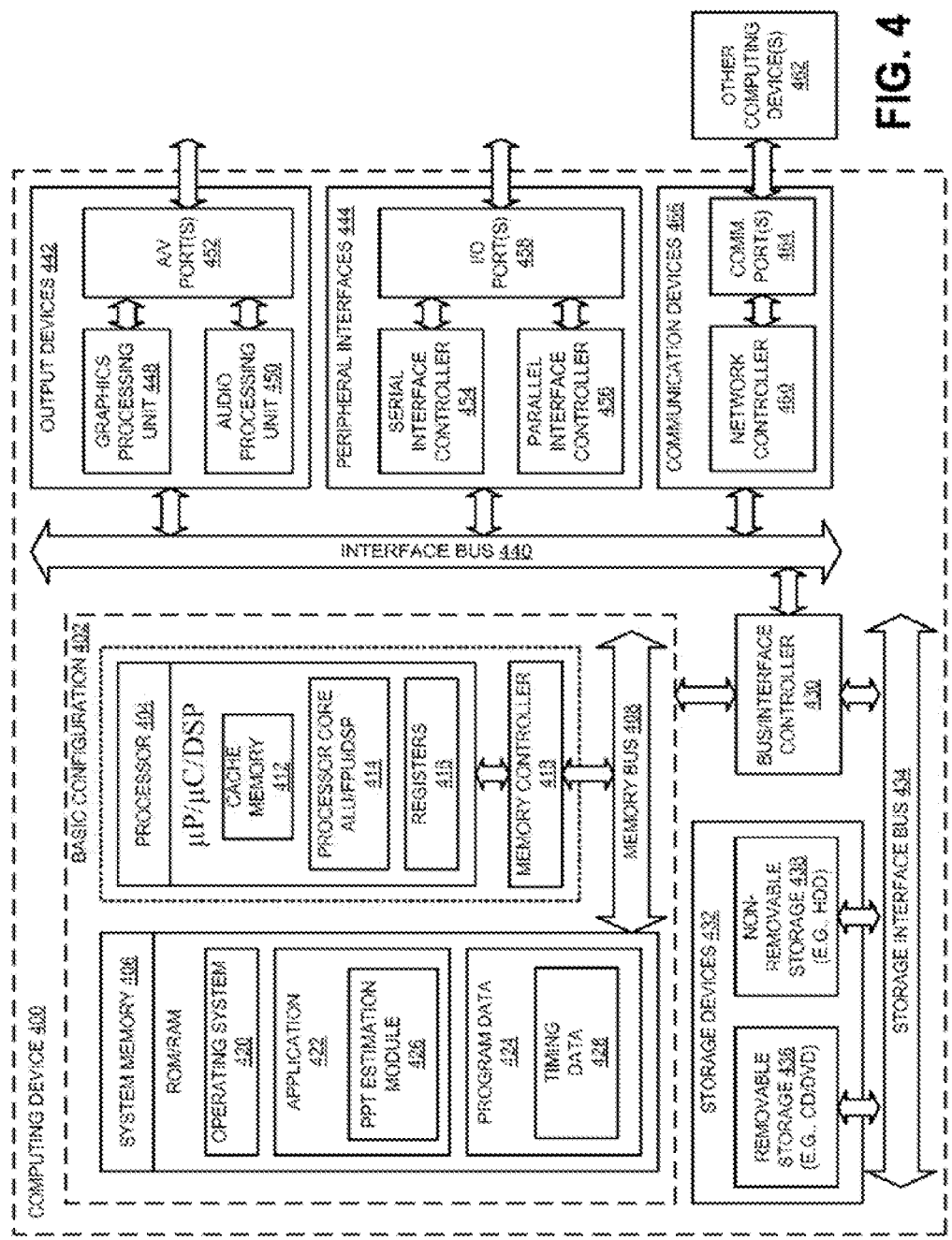
FIG. 4 illustrates a general purpose computing device, which may be used to implement measurement of packet processing time of end hosts through estimation of end link capacity.

FIG. 4 illustrates a general purpose computing device, which may be used to implement measurement of packet processing time of end hosts through estimation of end link capacity, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level cache memory 412, a processor core 414, and registers 416. Example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may be a network management application, network testing application, or comparable ones and include a PPT estimation module 426 that is arranged to measure packet processing time of end hosts through estimation of end link capacity. Program data 424 may include one or more of timing data 428 and similar data as discussed above in conjunction with at least FIG. 1 through 3. This data may be useful for measuring packet processing time of a remotely connected host device as is described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 466) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device that include any of the above functions. Computing device 400 may also be implemented as a personal computer including both laptop computer and non-laptop computer configurations. Moreover computing device 400 may be implemented as a networked system or as part of a general purpose or specialized server.

Networks for a networked system including computing device 400 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 5:
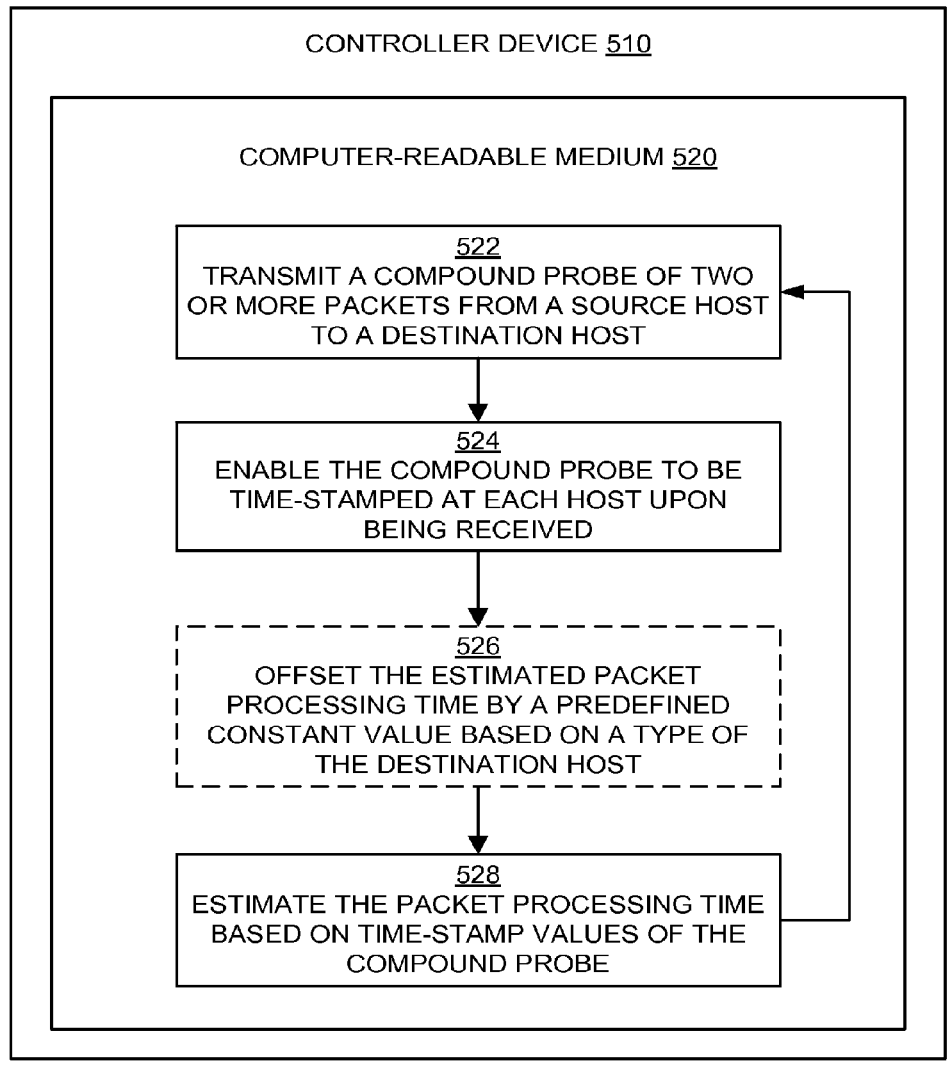
FIG. 5 is a flow diagram illustrating an example method for measuring packet processing time of end hosts through estimation of end link capacity that may be performed by a computing device such as the device in FIG. 4.

FIG. 5 is a flow diagram illustrating an example method for measuring packet processing time of end hosts through estimation of end link capacity that may be performed by a computing device such as the device in FIG. 4, arranged in accordance with at least some embodiments described herein.

Thus, controller device 510 may be embodied as computing device 400, or similar devices executing instructions stored in computer-readable medium 520 for performing the method. A process of measuring packet processing time of end hosts through estimation of end link capacity may include one or more operations, functions or actions as is illustrated by one or more of blocks 522, 524, 526, and/or 528.

Some example processes may begin with operation 522, "TRANSMIT A COMPOUND PROBE OF TWO OR MORE PACKETS FROM A SOURCE HOST TO A DESTINATION HOST". At operation 522, a train of probe packets may be sent from the source host 342 to the destination host 346.

Operation 522 may be followed by operation 524, "ENABLE THE COMPOUND PROBE TO BE TIME-STAMPED AT EACH HOST UPON BEING RECEIVED." At operation 524, the probe packets may be time-stamped upon receipt at the host.

Operation 524 may be followed by optional operation 526, "OFFSET THE ESTIMATED PACKET PROCESSING TIME BY A PREDEFINED CONSTANT VALUE BASED ON A TYPE OF THE DESTINATION HOST". At optional operation 526, the PPT estimation module 426 may offset the computed value by a constant value. The constant value may be predefined based on destination host type(s).

Optional operation 526 may be followed by operation 528, "ESTIMATE THE PACKET PROCESSING TIME BASED ON TIME STAMP VALUES OF THE COMPOUND PROBE". At operation 528, a PPT estimation module may compute the estimated PPT based on the time stamp values. In some examples, an affected-gap filtering scheme may be executed before operation 528. The affected-gap filtering scheme may be iterative and may include optional iterations, depending on the quality of the sampled data (e.g., whether it has too much noise or not).

To remove errors, the filtering scheme may first identify the smaller and frequent intra-probe gaps in a sampled set to determine the level of packet-processing jitter, and then compute the standard deviation of the sampled set to find a range of acceptable (i.e., unaffected by cross traffic) intra-probe gaps. Following are steps for an example filtering technique on the affected intra-probe gaps in a sampled set: (1) identify the smallest intra-probe gap of the sampled set; (2) determine the frequencies of intra-probe gaps (i.e., histogram) in the sampled set; (3) select the smallest intra-probe gap that appears with the highest frequency; (4) estimate the intra-probe gap variations, or packet processing jitter, and discard data elements in the sampled set that are greater than the sum of the peak gap (step 3) and the variation of the gaps; (5) compute the average intra-probe gap and the standard deviation of the new sampled set (after step 4); and (6) determine the lower and the upper bounds of the intra-probe gaps.

The operations included in the process of FIG. 5 described above are for illustration purposes. Measurement of packet processing time of end hosts through estimation of end link capacity may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 6:
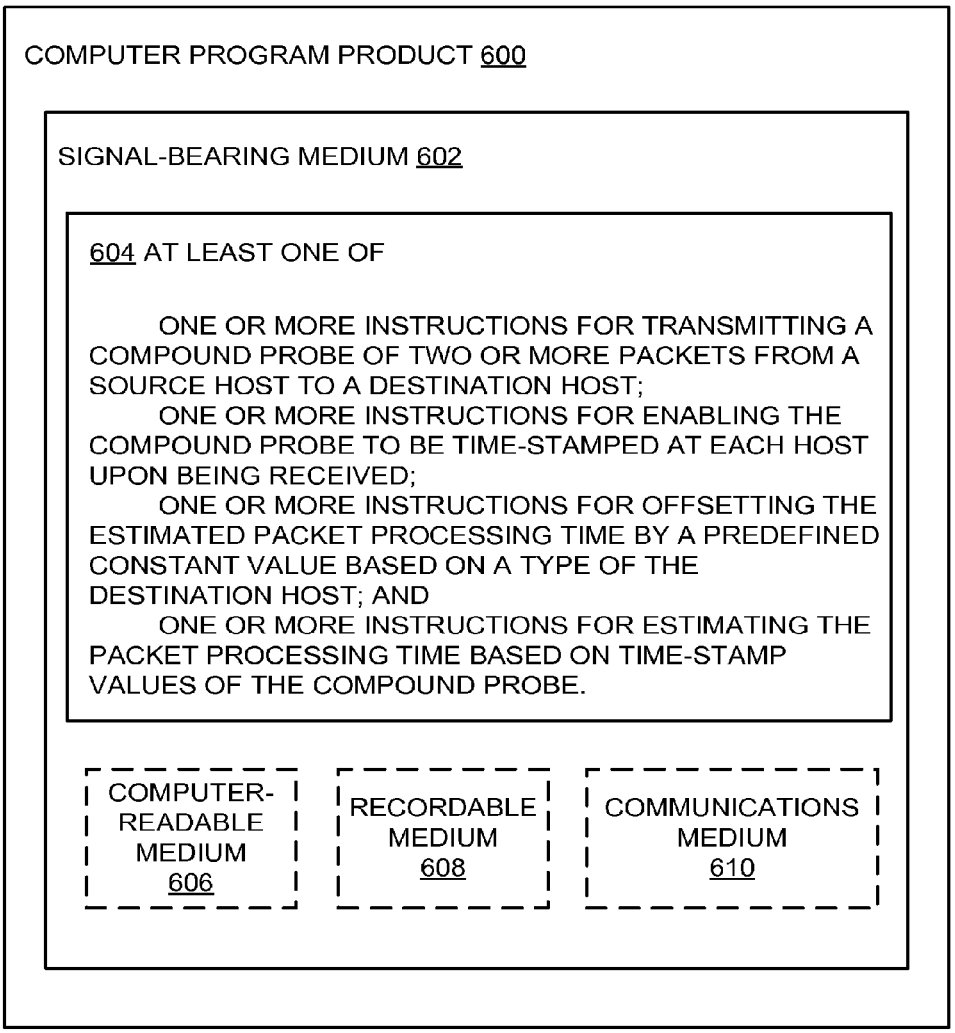
FIG. 6 illustrates a block diagram of an example computer program product for implementing measurement of packet processing time of end hosts through estimation of end link capacity.

FIG. 6 illustrates a block diagram of an example computer program product, arranged in accordance with at least some embodiments described herein.

In some examples, as shown in FIG. 6, computer program product 600 may include a signal bearing medium 602 that may also include machine readable instructions 604 that, when executed by, for example, a processor, may provide the functionality described above with respect to FIG. 1 through FIG. 3. Thus, for example, referring to processor 404, one or more of the tasks shown in FIG. 6 may be undertaken in response to instructions 604 conveyed to the processor 404 by medium 602 to perform actions associated with measuring packet processing time of end hosts through estimation of end link capacity as described herein. Some of those instructions may include transmitting a compound probe comprising two or more packets from a source host to a destination host, enabling the compound probe to be time-stamped at each host upon being received, optionally offsetting the estimated packet processing time by a predefined constant value based on a type of the destination host, and estimating the packet processing time based on time-stamp values of the compound probe as described previously.

In some implementations, signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to the processor 404 by an RF signal bearing medium 602, where the signal bearing medium 602 is conveyed by a wireless communications medium 610 (e.g., a wireless communications medium conforming with the IEEE 802.11 standard).

According to some examples, a method for measuring packet processing time of end hosts through estimation of end link capacity is described. An example method may include transmitting a compound probe comprising two or more packets from a source host to a destination host, enabling the compound probe to be time-stamped at each host upon being received, and/or estimating the packet processing time based on time-stamp values of the compound probe.

According to other examples, the method may further include selecting the packets in the compound probe of different sizes, selecting the packet sizes to define properties of dispersion gaps, or estimating the end link capacity based on measuring one or more intra-probe packet gaps. The intra-probe packet gaps may be measured based on a comparison of the time-stamp values.

According to further examples, the method may also include estimating the packet processing time from a linear relationship between the intra-probe packet gaps and packet sizes of respective compound probe packets, offsetting the estimated packet processing time by a predefined constant value based on a type of the destination host, or estimating the packet processing time over a plurality of multiple-hop network paths. The method may also include repeatedly transmitting the compound probe and estimating the packet processing time under different network path conditions. Alternatively, the method may include repeatedly transmitting the compound probe and estimating the packet processing time under high network congestion conditions.

According to other examples, a computing device for measuring packet processing time of end hosts through estimation of end link capacity is described. An example computing device may include a communication module configured to communicate with a plurality of other computing devices over one or more networks, a memory configured to store instructions, and a processor configured to execute a packet processing timing module. The packet processing timing module may transmit a compound probe comprising a train of probe packets from a source host to a destination host, enabling the probe packets to be time-stamped at each host upon being received, and estimate the PPT based on time-stamp values of the probe packets.

According to further examples, the PPT module may further select the probe packets in the compound probe of different sizes, select the probe packet sizes to define properties of dispersion gaps, or estimate the end link capacity based on measuring one or more intra-probe packet gaps. The intra-probe packet gaps may be measured based on a comparison of the time-stamp values.

According to yet other examples, the PPT module may estimate the PPT from a linear relationship between the intra-probe packet gaps and packet sizes of respective probe packets, offset the estimated PPT by a predefined constant value based on a type of the destination host, and/or estimate the PPT over a plurality of multiple-hop network paths. The PPT module may repeatedly transmit the compound probe and estimate the PPT under different network path conditions or repeatedly transmit the compound probe and estimate the PPT under high network congestion conditions. The computing device may be a network management server. Furthermore, the source and destination hosts may be a user end device, a workstation, or a server.

According to further examples, a computer-readable storage medium with instructions stored thereon for measuring packet processing time of end hosts through estimation of end link capacity is described. The instructions may cause a method to be performed when executed. The method may include transmitting a compound probe comprising two or more packets from a source host to a destination host, enabling the compound probe to be time-stamped at each host upon being received, and/or estimating the packet processing time based on time-stamp values of the compound probe.

According to some examples, the method may further include selecting the packets in the compound probe of different sizes, selecting the packet sizes to define properties of dispersion gaps, or estimating the end link capacity based on measuring one or more intra-probe packet gaps. The intra-probe packet gaps may be measured based on a comparison of the time-stamp values.

According to yet other examples, the method may also include estimating the packet processing time from a linear relationship between the intra-probe packet gaps and packet sizes of respective compound probe packets, offsetting the estimated packet processing time by a predefined constant value based on a type of the destination host, or estimating the packet processing time over a plurality of multiple-hop network paths. The method may also include repeatedly transmitting the compound probe and estimating the packet processing time under different network path conditions. Alternatively, the method may include repeatedly transmitting the compound probe and estimating the packet processing time under high network congestion conditions.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to measure packet processing time of end hosts through estimation of end link capacity, the method comprising:
    transmitting a compound probe comprising two or more packets from a source host to a destination host;
    enabling the compound probe to be time-stamped at each host after being received; and
    estimating the packet processing time based on one or more of time-stamp values of the compound probe and a linear relationship between one or more intra-probe packet gaps and packet sizes of respective compound probe packets, wherein the one or more intra-probe packet gaps are determined based on a comparison of the time-stamp values.

2. The method according to claim 1, further comprising:
    selecting the two or more packets in the compound probe of different sizes.

3. The method according to claim 2, further comprising:
    selecting the sizes of the two or more packets to define properties of dispersion gaps.

4. The method according to claim 1, further comprising:
    offsetting the estimated packet processing time by a constant value based on a type of the destination host.

5. The method according to claim 1, further comprising:
    repeatedly transmitting the compound probe and estimating the packet processing time under different network path conditions.

6. The method according to claim 1, further comprising:
    repeatedly transmitting the compound probe and estimating the packet processing time under high network congestion conditions.

7. A computing device to measure packet processing time of end hosts through estimation of end link capacity, the computing device comprising:
    a communication module configured to communicate with a plurality of other computing devices over one or more networks; and
    a processor coupled to the communication module and configured to execute a packet processing time (PPT) estimation module, wherein the PPT estimation module is configured to:
        cooperate with the communication module to transmit a compound probe comprising a train of probe packets from a source host to a destination host;
        enable the probe packets to be time-stamped at each host after being received; and
        estimate the PPT based on one or more of time-stamp values of the probe packets and a linear relationship between one or more intra-probe packet gaps and packet sizes of respective probe packets, wherein the one or more intra-probe packet gaps are determined based on a comparison of the time-stamp values.

8. The computing device according to claim 7, wherein the PPT estimation module is further configured to:
    select the probe packet sizes to define properties of dispersion gaps.

9. The computing device according to claim 7, wherein the PPT estimation module is further configured to:
    estimate the end link capacity based on measurement of the one or more intra-probe packet gaps.

10. The computing device according to claim 7, wherein the PPT estimation module is further configured to:
    offset the estimated PPT by a constant value based on a type of the destination host.

11. The computing device according to claim 7, wherein the PPT estimation module is further configured to:
    estimate the PPT over a plurality of multiple-hop network paths.

12. The computing device according to claim 7, wherein the PPT estimation module is further configured to cooperate with the communication module to:
    repeatedly transmit the compound probe and estimate the PPT under different network path conditions.

13. The computing device according to claim 7, wherein the computing device is a network management server.

14. The computing device according to claim 7, wherein the source host and the destination host are one of a user end device, a workstation, or a server.

15. A computer-readable storage medium with instructions stored thereon to measure packet processing time of end hosts through estimation of end link capacity, the instructions in response to execution by a processor being able to cause a method to be performed, wherein the method comprises:
    transmitting a compound probe comprising two or more packets from a source host to a destination host;
    enabling the compound probe to be time-stamped at each host after being received; and
    estimating the packet processing time based on one or more of time-stamp values of the compound probe and a linear relationship between one or more intra-probe packet gaps and packet sizes of respective compound probe packets, wherein the one or more intra-probe packet gaps are determined based on a comparison of the time-stamp values.

16. The computer-readable storage medium according to claim 15, wherein the method further comprises:
    selecting the two or more packets in the compound probe of different sizes.

17. The computer-readable storage medium according to claim 15, wherein the probe packets arrive at the destination host with a zero-dispersion gap and the method further comprises:
    estimating the end link capacity based on measuring the one or more intra-probe packet gaps.

18. The computer-readable storage medium according to claim 15, wherein the method further comprises:
    offsetting the estimated packet processing time by a constant value based on a type of the destination host.

19. The computer-readable storage medium according to claim 15, wherein the method further comprises:
    estimating the packet processing time over a plurality of multiple-hop network paths.

20. The computer-readable storage medium according to claim 15, wherein the method further comprises:
    repeatedly transmitting the compound probe and estimating the packet processing time under high network congestion conditions.

* * * * *

UNITED STATES PATENT AND TRADEMARK OFFICE
CERTIFICATE OF CORRECTION

| | | |
|---|---|---|
| PATENT NO. | : 9,118,557 B2 | Page 1 of 1 |
| APPLICATION NO. | : 13/882687 | |
| DATED | : August 25, 2015 | |
| INVENTOR(S) | : Rojas-Cessa et al. | |

It is certified that error appears in the above-identified patent and that said Letters Patent is hereby corrected as shown below:

On The Title Page,

On Page 2, in Item (56), under "OTHER PUBLICATIONS", in Column 1, Line 37, delete "An effcien Pogammable 10 Giganit" and insert -- An efficient Programmable 10 Gigabit --, therefor.

On Page 2, in Item (56), under "OTHER PUBLICATIONS", in Column 1, Line 42, delete "tor" and insert -- for --, therefor.

In The Specification,

In Column 1, Line 9, delete "371" and insert -- § 371 --, therefor.

In Column 4, Line 41, delete "lame" and insert -- large --, therefor.

Signed and Sealed this
Twenty-sixth Day of January, 2016

Michelle K. Lee
*Director of the United States Patent and Trademark Office*